Figure 1:
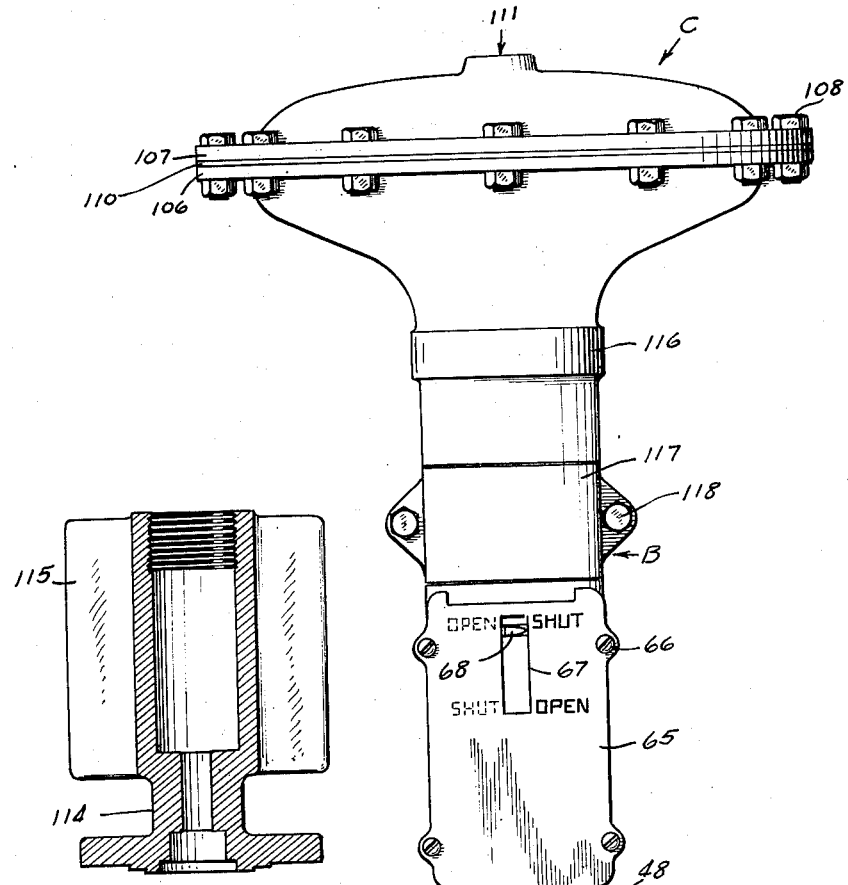

March 15, 1938. F. R. GOEHRING 2,110,859
VALVE
Filed March 16, 1936 2 Sheets-Sheet 1

Inventor
FRANCIS RUDOLPH GOEHRING
By Joshua R. H. Potts
Attorney

March 15, 1938. F. R. GOEHRING 2,110,859
VALVE
Filed March 16, 1936 2 Sheets-Sheet 2
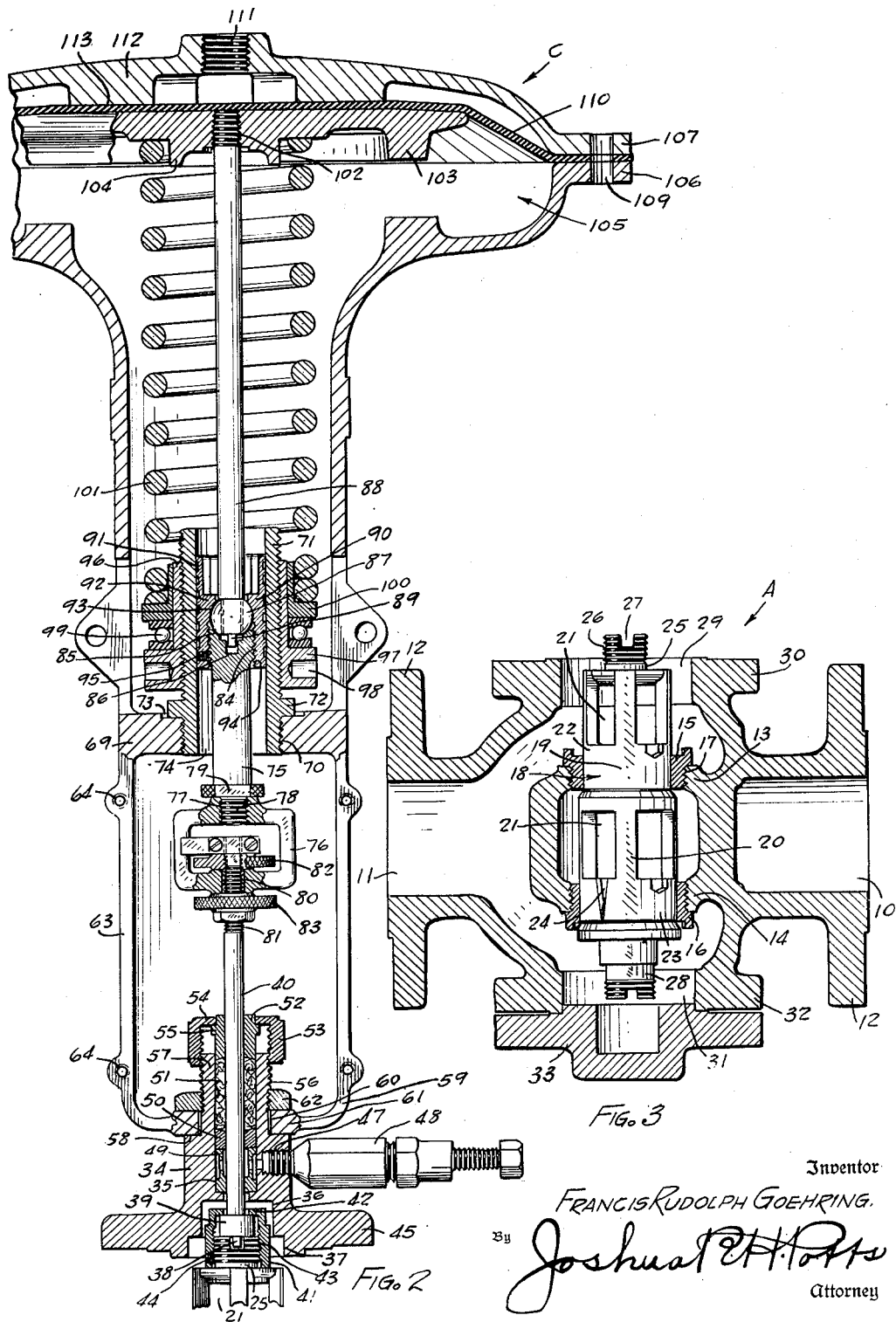
Inventor
FRANCIS RUDOLPH GOEHRING.
By Joshua R H Potts
Attorney Patented Mar. 15, 1938

2,110,859

UNITED STATES PATENT OFFICE 2,110,859

VALVE

Francis Rudolph Goehring, Philadelphia, Pa., assignor to H. Belfield Company, Philadelphia, Pa., a corporation of Pennsylvania Application March 16, 1936, Serial No. 68,977

2 Claims. (Cl. 137—153)

This invention relates to the art of valves and is particularly concerned with valves of the so-called diaphragm type in which the diaphragm is included as a part of the valve assembly to cause opening and closing movements on the part of the valve disk.

While the precepts of this invention are susceptible of being followed in any installation involving the use of a diaphragm operated valve, the valve mechanism hereof is designed primarily for use in controlling the flow of oil in refineries and similar places where it is important that the valve be effective to maintain a constant and uniform supply in the delivery of the fluid, the flow of which the valve controls.

It is common practice today in oil refineries, and the like, to avail of instruments which are affected by changes either in pressure or temperature to change the air pressure in the diaphragm chamber of the valve to cause either an opening or closing movement, as the case may be, of the valve disk. This movement on the part of the diaphragm, which is directly related to the pressure in the oil chamber, is transmitted through the valve stem which extends down through the valve yoke to the valve disk in the valve casing, and it is evident that the sensitiveness of operation of the valve is directly dependent on the amount of friction caused by the engagement of the valve stem with associated parts. It has been found that machining of the various parts to even a very high degree of precision, as well as the use of anti-friction devices, will not reduce this friction factor sufficient to provide a valve which is sensitive to a degree desirable in this art.

The failure of the efforts along this line is attributed directly to certain conditions which are inherent to valve assemblies of this type and which have a tendency to increase the friction along the valve stem. In each instance, the effect caused by the condition has a tendency on the valve stem to become misaligned, and the lateral pressure of such misalignment naturally increases the friction factor.

The first, and perhaps more noticeable condition above mentioned is that associated with the diaphragm itself. These diaphragms are ordinarily clamped between complemental parts which define the diaphragm chamber, and the tightening up of these parts on the edge of the diaphragm affects the latter to create stresses therein which are not entirely uniform and evenly distributed. As a result, the stem, which prior to this invention had been maintained rigid throughout its length and which was connected to the diaphragm, has a lateral stress exerted thereon with frictional increase resulting.

Yet another condition which is similar to the one above mentioned arises in attaching the disk to the valve stem. The fitting of the disk in the valve seat, particularly after periods of continued usage, causes the disk structure to assume a position which is ofttimes slightly out of line with the axis of the valve stem, and the effect of this misalignment is evidenced in increase of friction encountered by the valve stem.

With the foregoing conditions in mind, this invention has in view, as its paramount objective, the provision of a valve assembly of the diaphragm operated type in which provision is made to permit of certain parts of the valve stem to assume positions out of alignment, whereby lateral stresses are not resisted but are rather permitted to cause movement of parts of the valve stem.

In carrying out this idea in a practical embodiment, the practice of maintaining the valve stem rigid throughout its length is departed from and the valve stem is divided into sections which are connected together by joints which allow for the above noted misalignment.

Accordingly, a more detailed object of the invention is the provision in a diaphragm operated valve assembly of the character above described, a valve stem which includes a section connected at one end to the diaphragm, and at the other end to the valve stem assembly by a universal connection.

More in detail, this invention has in view, as an important object, the utilization of a ball joint between the section which is connected to the diaphragm and the remainder of the valve stem.

Yet another object in view is the provision of a connection between the valve disk and the valve stem and which connection is effective to accommodate misalignment of the valve disk.

A further object in view is to provide, in a diaphragm operated valve assembly of the character described, a valve stem made up of sections, one of which is connected to a valve disk and passes through a suitable packing arrangement in the form of a stuffing box. This invention also contemplates inclusion of an intermediate section which is connected by a clamped yoke connection with the stem section which is attached to the disk, and at the other end by a universal joint with a section which is attached to the diaphragm.

In accordance with this invention, a sectional valve stem is provided which includes joints for permitting misalignment of the various sections. In this manner, the friction encountered by the valve stem in reciprocating movement thereof is greatly reduced and the force necessary to cause movement of the valve into opening and closing positions, as the case may be, is greatly diminished. This feature has the further advantage of permitting of the use of a valve stem section of comparatively small diameter at the point where the stuffing box is availed of to guard against leakage from the valve casing. The sealing effects of this packing are greatly enhanced by the reduction in the diametric dimensions of the stem at this point.

Very often the flow of oil which is to be controlled by a valve assembly of the type with which this invention is concerned, takes place at a high velocity which results in the tendency of the valve disk to spin which is an undesirable factor for various obvious reasons. Accordingly, this invention aims at the elimination of this spinning on the part of the valve disk by providing connections between the disk and stem, as well as the various sections of the stem, all of which are effective to permit of relative play between these parts so as to allow for the misalignment and, at the same time, relative rotative movement between the several sections and valve disk is positively prevented.

Inasmuch as the material which flows through valves of this type is very often at a high temperature, it becomes important to provide for the radiation of heat at a point intermediate the valve disk and the stuffing box. Heretofore there have been proposed certain constructions involving the use of horizontally disposed radiating fins but these have not proven entirely satisfactory in that good circulation of air is not permitted by the horizontal disposition of the fins. As a result, the cooling effects are not what they might be. The invention, therefore, has in view, as another more detailed object, the provision, in a diaphragm operated valve assembly, of a radiating fin structure in which the fins are disposed vertically, thereby assuring of good air circulation and resulting improved cooling effects.

These and other more detailed objects and advantages will in part become apparent and in part be hereinafter stated as the description of the invention proceeds.

The invention, therefore, comprises a diaphragm operated valve assembly in which a valve disk is operatively connected to the diaphragm by a sectional valve stem in a manner preventing rotation of the valve disk, while relative misalignment of the several valve stem sections is permitted. Particular features of the invention reside in the design of the joints and connection provided at different points throughout the length of the valve stem.

Figure 4:
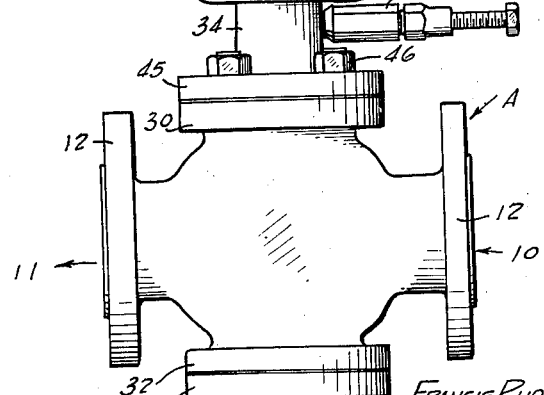

For a full and more complete understanding of the invention, reference may be had to the following description and accompanying drawings, wherein:

Figure 1 is a view in side elevation of a diaphragm operated valve assembly made in accordance with the precepts of this invention, Figure 2 is a vertical section taken through the upper part of the assembly, while Figure 3 is a similar vertical section taken through the valve casing, and Figure 4 is a view of a somewhat modified form in which cooling fins are employed.

Referring now to the drawings, wherein like reference characters denote corresponding parts, a diaphragm operated valve assembly is shown as comprising a valve casing which is referred to generally by the reference character A, a yoke B, and a diaphragm cover C, all of which are assembled in the manner indicated in Figure 1.

Referring now more particularly to Figure 3, the valve casing A is shown as formed with an inlet port 10 and an outlet port 11, each of which may be surrounded by flanges 12 which constitute a means for connecting the valve casing in a conduit in a well-known manner. The valve casing is formed interiorly thereof with a pair of spaced webs designated 13 and 14, each of which is provided with an opening around the peripheral edge of which are fitted seat rings 15 and 16, these seat rings being held in position in their respective openings in any preferred manner, as by screwthreaded connections shown at 17. The valve is illustrated as being of a reversible type as will later be described in detail.

The valve member 18 comprises two sections 19 and 20 of different diametrical dimensions. As shown in Figure 3, each of these sections is formed with a plurality of openings 21 which define a cage structure. Adjacent this cage structure, the valve member 19 is formed with a substantially cylindrical portion 22, while the valve member 20 is formed with a similar cylindrical portion 23. When the valve is in closed position, these cylindrical portions 22 and 23 fit in the seat rings 15 and 16 respectively to provide a complete seal. However, as shown in the drawings, these cylindrical portions 22 and 23 are formed with openings designated 24 which are of a required design and which are effective to permit of flow of fluid past the said rings 15 and 16 when the valve disk is lowered.

By properly designing the openings 24, a desired flow control may be obtained incident to certain definite movements of the valve member 18. Projecting upwardly from the section 19 is a stud 25 which is screw threaded as shown at 26, and the upper end of which is formed with a slot 27. A similar stud 28 projects from the section 20, but where the parts are assembled, as shown in Figure 3, this stud has no useful function, it being useful only when the valve is installed in a reverse position in which case downward movement of the member 18 would be effective to close rather than open the valve.

The valve casing A is also formed with an opening 29 which is surrounded by a horizontal flange 30, while a similar opening 31 is surrounded by a flange 32 at the other side of the casing. As shown in the drawings, this opening 31 is closed by a closure designated 33.

Fastened to the flange 30 of the valve casing A is a section 34 which is provided with an axial bore 35 for the major part of its length and which bore is enlarged as at 36, the enlarged portion 36 being further enlarged diametrically as indicated at 37. The stud 25 projects upwardly in the enlarged portion 37 and receives a lug 38 which is formed on a head 39 that is carried by a stem section 40 that extends through the bore 35. A retaining device is shown at 41 and which device is formed with a ring-like flange 42 that engages the head 39, the device 41 being interiorly threaded as shown at 43, and which threads 43 will receive the threads 26 of the stud 25. A set screw 44 is threaded into the device 41 and engages the stud 25 to positively prevent rotation between these parts.

This section 34 may be provided with an opening 47 that is threaded and which threaded opening 47 receives a lubricating attachment indicated at 48. Substantially opposite the opening 47, the bore 35 may receive a cage-like bearing member 49 which cooperates with the opening 47 in admitting lubricant to the stem 40. Upon the bearing member 49 is positioned a ring 50 which surrounds the stem section 40.

Packing 51 is shown as being disposed about the stem section 40 and engaging the ring section at one end and a packing gland 52 at the other. This packing gland 52 is urged against the packing 51 by a screw threaded member 53 that has an end flange 54 which engages a ring-like flange 55 on the gland 52, and which member 53 is threaded to exterior threads 56 formed on the portion 57 of the section 34 which is reduced in diameter. A shoulder 58 is formed intermediate the reduced portion 57 and the main body portion of the section 34.

The yoke B is formed with a bottom portion 59 which is provided with an opening 60, the yoke being enlarged about the opening 60 as indicated at 61. This enlarged portion 61 is clamped against the shoulder 58 by a nut 62 which is threaded to the threads 56. Immediately above the bottom portion 59, the yoke B is formed with a rectangular flat flange 63 which is provided with a plurality of threaded openings 64 which constitutes a means for removably attaching a plate 65 thereto, screws 66 being shown as holding the plate 65 in position. This plate 65 is formed with a slot 67, the edges of which may be provided with suitable indicia which cooperates with a pointer 68, carried by the stem section 40 to indicate the position of the valve disk 18.

As shown in Figure 1, when the pointer is at the upper end of the slot 67, the valve will be completely shut, and if the pointer 58 is at the lower end of the slot 67, the valve will be fully opened. Obviously, intermediate positions of the valve will be indicated by intermediate positions of the pointer.

Above the plate 65, the yoke B is formed with a horizontal partition 69 which is provided with a screw-threaded opening 70. An exteriorly threaded cylindrical member 71 is threaded into the opening 70 and this member 71 is formed with a flange 72 that engages a slight depression 73 formed in the partition 69. The cylindrical portion 71 has a bore 74 and extending upwardly into the bore 74 is a second stem section 75 which is connected by a yoke assembly with the stem section 40.

This yoke assembly comprises a yoke member 76 that is formed on its upper end with a screw-threaded opening 77 into which is screwed a stud 78 formed on the stem section 75. Wrench engaging means may be formed on this stem section 75 as indicated at 79. On the lower side, the yoke 76 is formed with an opening 80 which is larger in diameter than the stem section 40 which passes therethrough. The upper end of this stem section 40 is screw-threaded, as indicated at 81 and the upper end thereof carries a clamping ring 82 which cooperates with a lower clamping ring 83, also screwed on the threaded portion 81 of the stem 40 to clamp the yoke 76 therebetween.

The upper extremity of the stem section 75 is slightly enlarged and exteriorly screw-threaded as indicated at 84. This enlarged portion is provided with a truncated spherical recess 85 which terminates at the bottom in a slot 86.

A ball member 87 is formed on a third stem section 88 and carries a lug 89 which is fitted in the slot 86, the lower portion of the ball member 87 engaging the sides of the truncated spherical recess 85. A sleeve 90 is formed with lubricant receiving grooves 91 and is fitted in the bore 74 of the member 71. This sleeve 90 has an inwardly extending enlarged portion 92 that is also formed with a truncated spherical surface 93 which engages the ball member 87. The lower extremity of the sleeve 90 is interiorly screw-threaded as indicated at 94, whereby the sleeve 90 is threaded over the threads 84 formed on the stem section 75 to clamp the ball member 87 between the truncated spherical surfaces 93 and 85. A set screw is indicated at 95 and serves to prevent rotation of the sleeve 91 and stem section 75.

The cylindrical member 71 carries a sleeve 96 which is threaded thereon and the lower end of which is enlarged to form a ring flange 97 which is provided with wrench engaging sockets 98. Fitted about the sleeve 96 and engaging the ring 97 is a ball bearing assembly 99. Fitted over the sleeve 96 and positioned just above the ball bearing assembly 99 is a seat ring 100 which receives one end of a coil spring 101. It is evident that the sleeve 96 may be rotated without necessitating a rotation of the seat ring 100 due to the presence of the bearing assembly 99.

The reason for providing for rotation of the sleeve 96 is to provide for adjustment of the tension of the spring 101. At its upper end, the stem section 88 is provided with screw threads as indicated at 102 and this threaded portion is screwed into a diaphragm plate 103. The latter is formed with a downwardly projecting portion 104 which extends into the spring 101, the extremity of the latter engaging against the plate 103 proper.

At the upper extremity, the yoke B is enlarged so that it cooperates with the cover plate C to provide a diphragm chamber which is referred to as 105. The enlarged portion of the casing B is formed with a peripheral flange 106, while the cover plate C is formed with a complemental flange 107. Bolts indicated at 108 pass through openings 109 to clamp the flanges 106 and 107 together with the edge of a diaphragm 110 pressed therebetween.

The cover plate C is formed with a connection at 111 for connecting the same with a suitable air line and immediately surrounding the opening at 110, the cover seat is formed with a downwardly extending ring-like flange 112 having a flat surface 113 which engages the diaphragm 110 when the diaphragm plate 103 is in the uppermost position as shown in Figure 2.

Figure 4 develops a modification in which the section 34 is replaced by a corresponding section 114, the only difference between the sections 34 and 114 being that the latter is elongated and provided with vertically disposed cooling fins designated 115.

As shown in Figure 1, the valve casing B may be provided with a wrench engaging surface indicated at 116, while a removable section 117 is held in position by bolts 118 at a point whereby removal of the section 117 will provide access to the wrench engaging sockets 99 on the sleeve 96 to permit adjustment of tension of the spring 101.

The operation of the above described mechanism may be briefly outlined by first noting that when the parts are assembled, the edges of the diaphragm 103 will be clamped between the flanges 106 and 107. This causes certain stress to be set up in the diaphragm 103, which is of a well-known flexible type, and which stress will be effective to cause a certain amount of lateral displacement on the part of the stem section 88, this lateral movement being accommodated by the ball joint at 87. Also, any misalignment of the valve disk 18 caused by proper seating in the rings 15 and 16 will be taken care of by the connection at 41, the yoke 76 rigidly clamping the stem sections 75 and 40 together regardless of the aligned condition of these parts.

Upon air under pressure being admitted to the diaphragm chamber, through the opening at 101, the air pressure will be effective to overcome the effect of the spring 101 and move the stem sections 88, 75 and 40 downwardly, whereupon a corresponding downward movement is imparted to the valve disk 18 to cause the valve to assume a required open position. It is evident that rotation of the valve disk 18, incident to flow of fluid through the valve is prevented by the lug and slot connections at 38 and 89 respectively, as well as the yoke connection at 40.

While a preferred specific embodiment of the invention is hereinbefore stated, it is to be clearly understood that I am not to be limited to the exact constructions herein illustrated and described because various modifications of these details may be provided in putting the invention into practice within the purview of the appended claims.

I claim:

1. A valve of the character described comprising a valve casing, a valve member movable in the casing and adapted to assume different positions to control the flow of fluid through the casing, a yoke carried by the casing and formed with a diaphragm chamber, a diaphragm in the chamber, a stem section operatively connected to the diaphragm, a stem section connected to the valve member, an intermediate stem section connected to the first mentioned stem section by a ball joint and to the second mentioned stem section by a clamped connecting yoke, said connecting yoke being connected at one end to the intermediate stem section and at the other to valve stem section and packing disposed about the stem section which is connected to the valve member.

2. A valve of the character described comprising a valve casing, a valve member movable in the casing, a yoke attached to the casing and formed with a diaphragm chamber, a diaphragm in the chamber, and a sectional valve stem operatively connecting said diaphragm to the valve member, one section of said valve stem being keyed to the said valve member to prevent rotation between said parts, axial driving connections between the sections of said sectional valve stem each of which permits of a relative misalignment of said sections in any direction, said connections each including means to prevent relative rotation of the sections.

FRANCIS RUDOLPH GOEHRING.